Patented Dec. 18, 1951

2,579,432

UNITED STATES PATENT OFFICE 2,579,432

SENSITIZING DYES FROM BITHIAZOLES

Lee C. Hensley, Binghamton, N. Y., assignor to General Aniline & Film Corporation, New York, N. Y., a corporation of Delaware No Drawing. Application October 31, 1950, Serial No. 193,283

6 Claims. (Cl. 260—240.1)

This invention relates to new symmetrical tetranuclear dyes of the bithiazole type, which are particularly useful for sensitizing photographic emulsions and to photographic silver halide emulsions containing these dyes.

In the preparation of cyanine sensitizing dyes, several heterocyclic bases having two methyl groups have been used in the form of their di-quaternary salts to obtain asymmetrical dyestuffs with varying degrees of sensitizing activity and sensitizing ranges. The di-quaternary dyestuffs obtained from the dye salts of these bases have a tendency to diffuse in a gelatin layer. Dyes of this category are illustrated, for example, in United States Patents 1,994,170 and 2,108,845. It will be noted that the organic bases with two heterocyclic nuclei, i. e., 2,2'-dimethyl-6,8-bibenzoxazole and 2,6-dimethylbenzo [1.2.5.4] bisthiazole referred to in United States Patents 2,058,725 and 2,202,991, have two methyl groups only one of which is capable of condensing with a nitrogenous heterocyclic dye salt.

I have now discovered a new class of symmetrical tetranuclear dye salts in which the central nucleus, 4,4'-bithiazole, is linked to the other two nuclei by a mono or a poly-methine chain. These new dye salts have properties which are not possessed by the known unsymmetrical dyes. For instance, the dyes are not only sensitizers for both orthochromatic and panchromatic film emulsions, but are also excellent sensitizers for color film, being unaffected by the presence of color components and exhibiting the property of non-migration from the layer in which they are incorporated.

It is an object of the present invention to provide symmetrical tetranuclear photo-sensitizing dyestuffs containing a 4,4'-bithiazole nucleus.

A further object is to provide such dyes which are added to photographic silver halide emulsions whereby the sensitivity of the emulsion is increased.

A still further object is to provide photo-sensitizing dyestuffs having a strong sensitizing activity for color film emulsions and having a lesser tendency to diffuse in gelatin layers.

Other objects and advantages of this invention will become apparent by reference to the following specification in which its preferred details and embodiments are described.

This invention is predicated upon the discovery that 1 mol of a di-quaternary 2,2'-dimethyl-4,4'-bithiazole salt containing two methyl groups in the 2,2'-positions can be condensed with two mols of a nitrogenous heterocyclic dye salt of the type used in cyanine dyes. This discovery is wholly unexpected and surprising since di-quaternary cyclammonium salts of the prior art prepared from heterocyclic bases having two methyl groups are only reactive through one of these groups, but not through both groups.

The symmetrical tetranuclear dyestuffs prepared according to the present invention are characterized by the following general formulae:

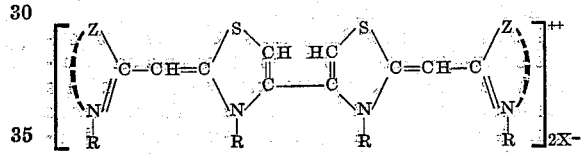

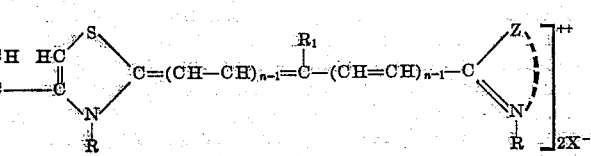

and

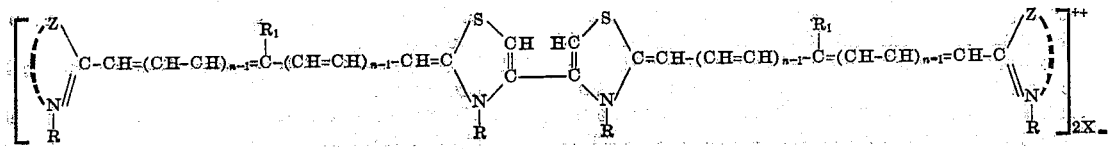

wherein R is an alkyl or aralkyl group, e.g., methyl, ethyl, propyl, butyl, amyl, etc., benzyl, phenethyl and the like, $R_1$ and $R_2$ are either hydrogen or an alkyl group, e. g., methyl, ethyl, propyl, butyl, and the like, $R_1$ being hydrogen only when $n$ equals 1, X represents an anionic acid radical, e. g., Cl, Br, I, $ClO_4$, $SO_4CH_3$, $SO_4C_2H_5$, $SO_3C_6H_4CH_3$, and the like, Z represents the atoms necessary to complete a 5- or 6-membered nitrogenous heterocyclic system of the type usual in cyanine dyes, such as pyridine, lepidine, quinoline, indoline, oxazole, thiazoline, thiazole, thiodiazole, pyrroline, selenazole, selenazoline, oxazoline, benzothiazole, benzoselenazole, benzoxazole, naphthothiazole, perinaphthiazole, naphthoselenazole, and the like, and $n$ represents a positive integer ranging from 1 to 2.

The process of preparing the above tetranuclear cyanine dyes comprises condensing by gentle heating or boiling, or by heating as on a steam bath or under reflux conditions, one mol of a diquaternary cyclammonium salt of 2,2'-dimethyl-4,4'-bithiazole with two mols of a cyclammonium quaternary cyanine dye intermediate of the type used in the preparation of cyanine dyes in the presence of an acid binding agent, such as a nitrogenous heterocyclic base containing a small quantity of a tertiary base which may include a small quantity of acetic acid or acetic anhydride. The anions of the dye salts thus obtained are readily converted into different anions by methods well known in the art.

The di-quaternary cyclammonium salts of 2,2'-dimethyl-4,4'-bithiazole utilized in the condensation reaction are characterized by the following general formula:

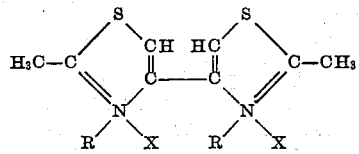

wherein R and X have the same values as above, and are obtained by quaternizing 2,2'-dimethyl-4,4'-bithiazole characterized by the following formula:

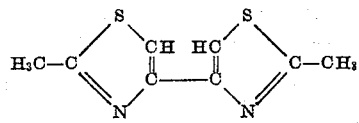

The 2,2'-dimethyl-4,4'-bithiazole is prepared in the following manner:

Eight and six-tenths grams (0.1 mol) of butanedione-2,3 (diacetyl) in 35 cc. of carbon disulfide were treated dropwise with stirring, with a solution of 10.6 cc. of bromine in 20 cc. of carbon disulfide at the boiling point of the carbon disulfide. The addition was completed in 3 hours. The stirring and heating were continued another 2 hours. After cooling, the carbon disulfide was decanted from the solid which had separated. The crystals were washed with petroleum ether (B. P. 60–75° C.). The melting point of the crude product was 109–111° C. After crystallizing from petroleum ether (B. P. 60–75° C.), the melting point was 117° C. and the yield of the product was 13.6 grams.

One gram of 1,4-dibromobutanedione-2,3 and 0.63 gram of thioacetamide were dissolved in 20 cc. of absolute methanol and warmed for 10 minutes on the steam bath. The mixture (a solid had separated) was poured into 100 cc. of water. The aqueous mixture was made acid with diluted hydrochloric acid and filtered. Upon neutralization, a brownish solid appeared in the filtrate. This solid was filtered off and recrystallized from methanol and had a melting point of 165° C.

The quaternization of the 2,2'-dimethyl-4,4'-bithiazole is effectuated by fusion with an alkylating agent, e. g., an alkyl or aralkyl halide or by heating the base with an alkylating agent, e. g., alkyl or aralkyl halide in a sealed tube in a water bath under increased pressure in the usual manner. The alkylating agent employed may be methyl or ethyl iodide, dimethyl sulfate, methyl p-toluenesulfonate, phenethyl iodide, and the like.

The cyclammonium salts of the type used or proposed for the production of cyanine dyes, and utilized in accordance with the present invention may be any one of those having an appropriate group in the reactive position to the nitrogen atom thereof. As examples of suitable cyclammonium quaternary cyanine dye salt intermediates having a reactive group in the 2-position to the nitrogen atom thereof so as to form a di-monomethine dye, the following may be mentioned:

2-methylmercapto-6-methylquinoline ethiodide
2-methylmercaptopyridine ethiodide
2-methylmercaptothiazoline ethiodide
2-phenylmercaptothiazoline ethiodide, and the like.

In preparing straight chain di-trimethine cyanine dye salts and branched chain di-trimethine cyanine dye salts, the following cyclammonium quaternary dye salt intermediates having a reactive group in the β-position of the side chain in the 2-position of the nitrogen atom thereof may be employed:

2-(β-acetanilidovinyl)-thiazoline ethiodide
2-(β-acetanilidovinyl)-benzothiazole ethiodide
2-(β-acetanilidovinyl)-benzoxazole ethiodide
2-(β-ethyl-β-methylmercaptophenyl)-5-methoxy benzoselenazole ethiodide
2-(β-methylmercapto - β - methylphenyl)-benzothiazole ethiodide
2-(β-methylmercapto-β-propylphenyl)-benzothiazole ethiodode.

In preparing straight chain or branched chain dipentamethine and diheptamethine cyanine dye salts, the following cyclammonium quaternary salts having a reactive group in delta- and zeta-positions of the side chain in 2-position of the nitrogen atom thereof may be employed:

2-(4-acetanilido-1,3 - butadienyl)-pyridine ethiodide
2-(4 - acetanilido - 1,3 - butadienyl)-benzoxazole ethiodide
2-(4-ethoxy-1,3-butadienyl)-pyridine ethiodide
2-(4-anilino-3-methyl - 1,3-butadienyl)-pyridine ethiodide
2-(4-anilino-3-methyl - 1,3-butadienyl)-β-naphthoxazole ethiodide
2-(4-anilino-3-ethyl - 1,3 - butadienyl)-α-naphthothiazole ethiodide
2-(6-anilino-1,3,5 - hexatrienyl)-thiazoline ethiodide
2-(6-anilino - 1,3,5 - hexatrienyl)-α-naphthothiazole ethiodide
2-(6-anilino - 1,3,5 - hexatrienyl)-β-naphthothiazole ethiodide
2-(6-anilino - 1,3,5-hexatrienyl)-α-naphthoselenazole ethiodide
2-(6-anilino - 1,3,5-hexatrienyl-β-naphthoselenazole ethiodide 2-(6-anilino-4-methyl - 1,3,5 - hexatrienyl)-thiazoline ethiodide
2-(6-anilino-4-methyl - 1,3,5 - hexatrienyl)-benzothiazole ethiodide
2-(6-anilino-4-butyl - 1,3,5 - hexatrienyl)-benzothiazole ethiodide.

The above cycloammonium quaternary dye salt intermediates are well known to the art and hence the methods for their preparation need not be discussed herein. While the above dye intermediates are disclosed as being in the form of the preferred ethiodide, it is to be understood that they may also be employed in the form of other quaternary salts previously mentioned.

In the preparation of these new symmetrical tetranuclear dyestuffs, the 2,2'-dimethyl-4,4'-bithiazole base is converted into the corresponding alkyl or aralkyl quaternary cycloammonium salt in the manner usual with the conversion of other nitrogenous heterocylic bases to the quaternary salt form. As previously pointed out, this may be effected by fusion with alkyl or aralkyl halide or by heating the base with an alkyl or aralkyl halide in a sealed tube in a water bath under increased pressure. A molecular equivalent of the quaternary salt thus obtained is heated with two molecular equivalents of the cycloammonium cyanine dye salt intermediate in the presence of a condensing agent, such as a heterocyclic nitrogenous base or an alcohol containing a small quantity of a tertiary base at reflux temperature.

As condensing agents employed in the preparation of the new dyes of the present invention, the following may be advantageously employed: heterocyclic nitrogenous bases such as pyridine, methylpyridine, dimethylpyridine, ethylpyridine, ethylmethylpyridine, trimethylpyridine, quinoline and the like, or an alcohol, such as methyl, ethyl, propyl, isopropyl, butyl, isobutyl and the like, in the presence of a basic tertiary catalyst, such as trimethylamine, triethylamine, and the like.

The following examples describe in detail the methods for accomplishing the above objects, but it is to be understood that they are inserted merely for the purpose of illustration and are not to be construed as limiting the scope of the invention.

*Example I*

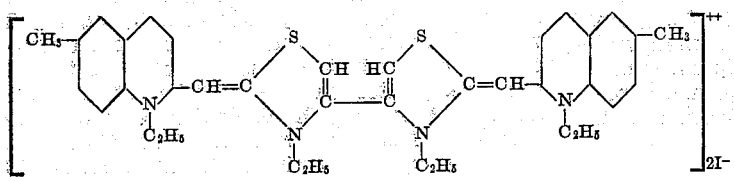

Seven-tenths gram of 2 - methylmercapto-6-methylquinoline ethiodide and 0.6 gram of 2,2'-dimethyl-4,4'-bithiazole di-(ethyl p- toluenesulfonate) in 8 cc. of methanol containing 0.5 cc. of triethylamine were gently heated until methylmercaptan ceased to be evolved. After standing several hours, the solid was filtered by suction. The dye was purified by boiling with a small amount of methanol and crystallized from pyridine.

The purified product had a melting point of 245–246° C. A methanol solution of the dye showed an absorption maximum at 497 mμ. The dye sensitized a silver bromoiodide emulsion from 450 mμ to 570 mμ, with a sensitivity maximum at 540 mμ.

*Example II*

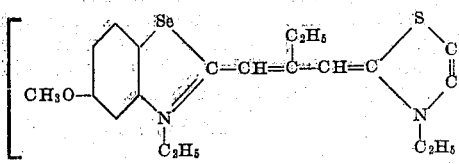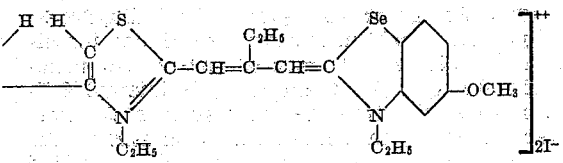

Fifty-five hundredths gram of 2,2'-dimethyl-4,4-bithiazole di-(ethyl p-toluenesulfonate) was dissolved in 10 cc. of methanol with slight warming. To this mixture 8 drops of triethylamine were added. After 2 to 3 minutes, 1.1 grams of 2-(β-ethyl-β-methyl-mercaptovinyl) - 5 - methoxy-benzoselenazole ethiodide were added and the mixture gently boiled for 10 minutes. After cooling the reaction mixture, 25 cc. of 10% aqueous potassium iodide solution were added with stirring. After standing a short time, the solid was filtered off and washed with ether. The crude dye was digested in 50 cc. of an equal mixture of methanol and isopropanol. After standing overnight, the dye was filtered off and recrystallized from the methanol.

The yield of the dye obtained was .47 gram with a melting point of 230–232° C. A methanol solution of the dye showed an absorption maximum at 571 mμ. The dye sensitized a silver bromoiodide emulsion from 500 mμ to 655 mμ, with a sensitivity maximum at 620 mμ.

*Example III*

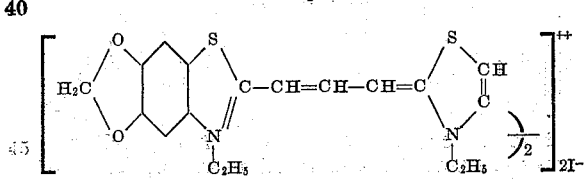

One gram of 2-(β-acetanilidovinyl)-5,6-methylenedioxy-benzothiazole ethiodide, .6 gram of 2,2'-dimethyl-4,4'-bithiazole di-(ethyl p-toluenesulfonate), 25 cc. of pyridine, and 1 cc. of triethylamine were gently boiled for 15 minutes. After cooling, two volumes of dilute aqueous potassium iodide were added. The solid was filtered off and washed with water and then ether. The product was purified by (1) digesting with isopropanol, (2) digesting with an equal mixture of methanol and isopropanol, (3) digesting with methanol. The mixture was allowed to cool each time before the product was filtered off.

The weight of the final product was 0.45 gram with a melting point of 249–250° C. A methanol solution of the dye showed an absorption maximum at 600 mμ. The dye sensitized a silver bromoiodide emulsion from 520 mμ to 670 mμ, with a sensitivity at 640 mμ.

Example IV

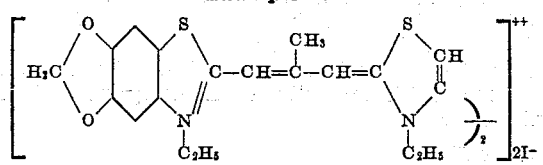

Fifty-six hundredths gram of 2,3-dihydro-3-ethyl - 5,6 - methylenedioxy - 2 - thioacetonylidenebenzothiazole, 1 gram of methyl p-toluenesulfonate, and 0.3 gram of 2,2'-dimethyl-4,4'-bithiazole di-(ethyl p-toluenesulfonate) were warmed gently in a free flame with stirring for 4–5 minutes. Five cc. of methanol were added and the mixture boiled until about half of the methanol had boiled off. Twenty-five cc. of pyridine and 15 drops of triethylamine were added and the mixture boiled for 5 minutes. After cooling, 100 cc. of a 10% potassium iodide solution were added to the reaction solution with stirring. The mixture was allowed to stand 3 hours, the product filtered off and air dried. The dye was digested with 70 cc. of isopropanol. After cooling, the solid was filtered off, dissolved in 150 cc. of hot methanol, filtered while hot, and the filtrate evaporated to about 70 cc. The addition of about one-half volume of ether caused the dye to separate as a powder.

The yield of the final dye was 0.13 gram having a melting point of 267–269° C. A methanol solution of the dye showed an absorption maximum at 573 m$\mu$. The dye sensitized a silver bromoiodide emulsion from 500 m$\mu$ to 645 m$\mu$, with a sensitivity maximum at 620 m$\mu$.

Example V

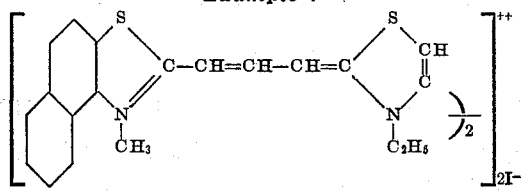

Five-tenths gram of 2-($\beta$-acetanilidovinyl)-4,5-benzo-benzothiazole methiodide and 0.3 gram of 2,2' - dimethyl - 4,4' - bithiazole di-(ethyl p-toluenesulfonate) in 10 cc. of pyridine containing 10 drops of triethylamine were stirred at room temperature for 5 minutes and then gently boiled for 5 minutes. After cooling, the reaction mixture was diluted with 25 cc of a 10% aqueous solution of potassium iodide. After an hour, the product was filtered off and washed with water and then ether. The product was digested for 15 minutes with 40 cc. of isopropanol. After cooling, the product was filtered off and redigested twice with 40 cc. portions of methanol.

The yield of the purified dye was 0.3 gram with a melting point of 236–237° C. A methanol solution of the dye showed an absorption maximum at 590 m$\mu$. The dye sensitized a silver bromoiodide emulsion from 510 m$\mu$ to 680 m$\mu$, with a sensitivity maximum at 640 m$\mu$.

Example VI

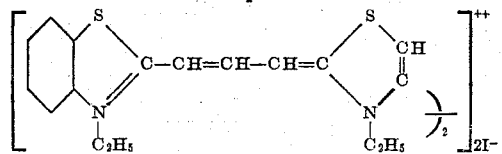

Forty-five hundredths gram of 2,2'-dimethyl-4,4'-bithiazole di-(ethyl p-toluenesulfonate) and 0.8 gram of 2-($\beta$-acetanilidovinyl)-benzothiazole in 25 cc. of n-propanol containing a few drops of triethylamine were heated, at gentle reflux, for 18 minutes. The solid that separated on cooling was washed with ether and n-propanol. It was then digested with n-propanol. After cooling, the dye was filtered and dried.

The yield of the final dye was 0.3 gram with a melting point of 230° C. A methanol solution of the dye showed an absorption maximum at 577 m$\mu$. The dye sensitized a silver bromoiodide emulsion from 500 m$\mu$ to 650 m$\mu$, with a sensitivity maximum at 610 m$\mu$.

Example VII

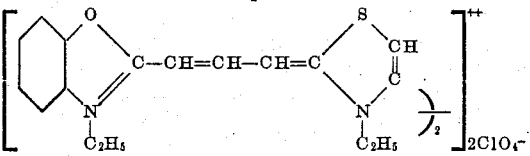

Eighty-seven hundredths gram of 2-($\beta$-acetanilidovinyl) - benzoxazole ethiodide and 0.6 gram of 2,2'-dimethyl-4,4'-bithiazole di-ethiodide were dissolved in 30 cc. of methanol and warmed on a steam bath for 15 minutes in the presence of 10 drops of triethylamine. Five drops of a 40% aqueous solution of sodium perchlorate were added and the mixture warmed another 15 minutes. After cooling, the crystals were filtered off and recrystallized from methanol.

The crystallized dye had a melting point of 273–274° C. A methanol solution of the dye showed an absorption maximum at 532 m$\mu$. The dye sensitized a silver bromoiodide emulsion from 460 m$\mu$ to 605 m$\mu$, with a sensitivity maximum at 560 m$\mu$.

Example VIII

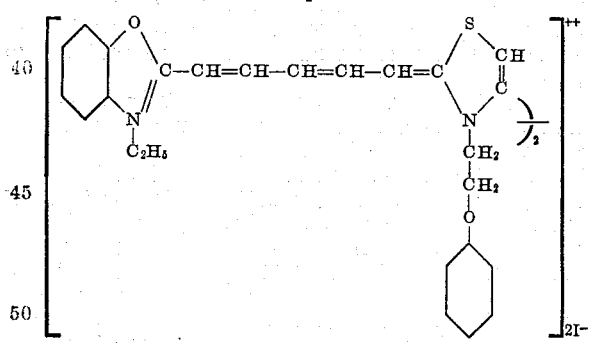

One and fifteen hundredths gram of 2-($\delta$-acetanilidobutadienyl)-benzoxazole ethiodide, 0.98 gram of 2,2'-dimethyl-4,4'-bithiazole di-(phenoxyethyl p-toluenesulfonate), and 8 drops of triethylamine were stirred for 5 minutes at room temperature in 6 cc. of pyridine. The solution was then gently boiled for 4 minutes. After cooling, the dye was precipitated by adding 2 volumes of a 20% aqueous potassium iodide solution. The product was dissolved in methanol and precipitated by the addition of a small amount of water. The dye after being crystallized twice from methanol melted at 193–195° C.

The absorption maximum in methanol is 613 m$\mu$. The sensitization maximum in a silver iodobromide emulsion is at 665 m$\mu$ with the sensitivity range extending from 540 m$\mu$ to 700 m$\mu$.

In the preparation of emusions containing these tetranuclear cyanine dyes, the dye may be dissolved in methyl or ethyl alcohol and the alcoholic solution containing from 5 to 50 milligrams of the dye added to a liter of emulsion. While in general practice, it may not be necessary to add the dye in amounts larger than those above given, generally, for satisfactory results, amounts ranging from 5 to 25 milligrams are sufficient to obtain the maximum sensitizing effect. However, I do not wish to limit my invention to the quantities just indicated, as the most suitable amount will in each case be found by a few comparative experiments. The dyes may be added to the emulsion in the form of solutions. Suitable solvents, as indicated in the examples, are the alcohols, for instance, methyl or ethyl alcohol, which may be anhydrous or diluted with a small volume of water. In actual practice, the dyes are applied to the emulsion during any stage of its production. However, they are preferably added to the finished emulsion before coating.

This application is a continuation-in-part of my application Serial No. 67,075, filed December 23, 1948, now abandoned.

While the present invention has been described in considerable detail with respect to certain preferred procedures, materials, and uses, it is to be understood that the new classes of tetranuclear cyanine dyes and their use as sensitizing dyes is not limited thereto and numerous variations and modifications may be made, as for example, by condensing the di-quaternary ammonium salt of 2,2'-dimethyl-4,4'-bithiazole with a dialkylaminobenzene in the presence of a basic condensing agent, e. g., piperidine, di-styryl dyes are obtained. Accordingly, it is intended that the invention be defined only by the accompanying claims in which it is intended to include all patentable novelty residing therein.

I claim:

1. Tetranuclear dyestuffs characterized by a formula selected from the class consisting of the following formulae:

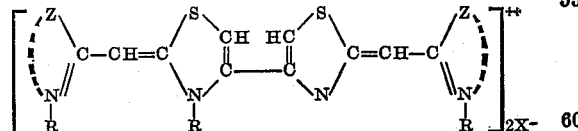

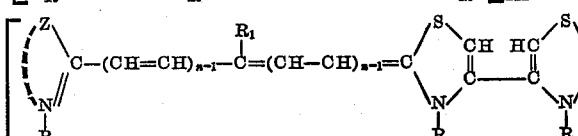

and

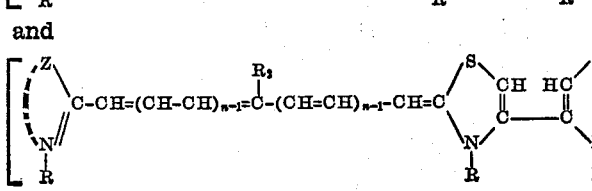

wherein R represents a member selected from the class consisting of alkyl and aralkyl groups, $R_1$ and $R_2$ represent a member selected from the class consisting of hydrogen and alkyl groups, $n$ represents a positive integer ranging from 1 to 2, X represents an anionic radical, and Z represents the atoms necessary to complete a member selected from the class consisting of 5- and 6-membered nitrogenous heterocyclic system of the type usual in cyanine dyes.

2. A tetranuclear cyanine dyestuff of the following structure:

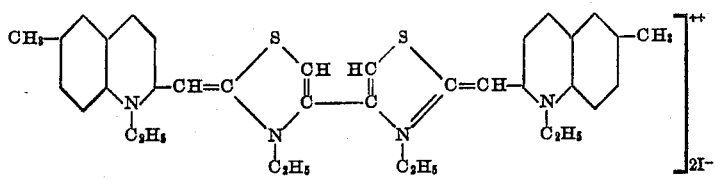

3. A tetranuclear cyanine dyestuff of the following structure:

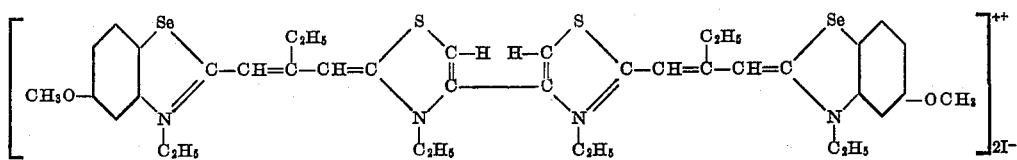

4. A tetranuclear cyanine dyestuff of the following structure:

5. A tetranuclear cyanine dyestuff of the following structure:

6. A tetranuclear cyanine dyestuff of the following structure:

LEE C. HENSLEY.

No references cited.